Patented Feb. 19, 1935

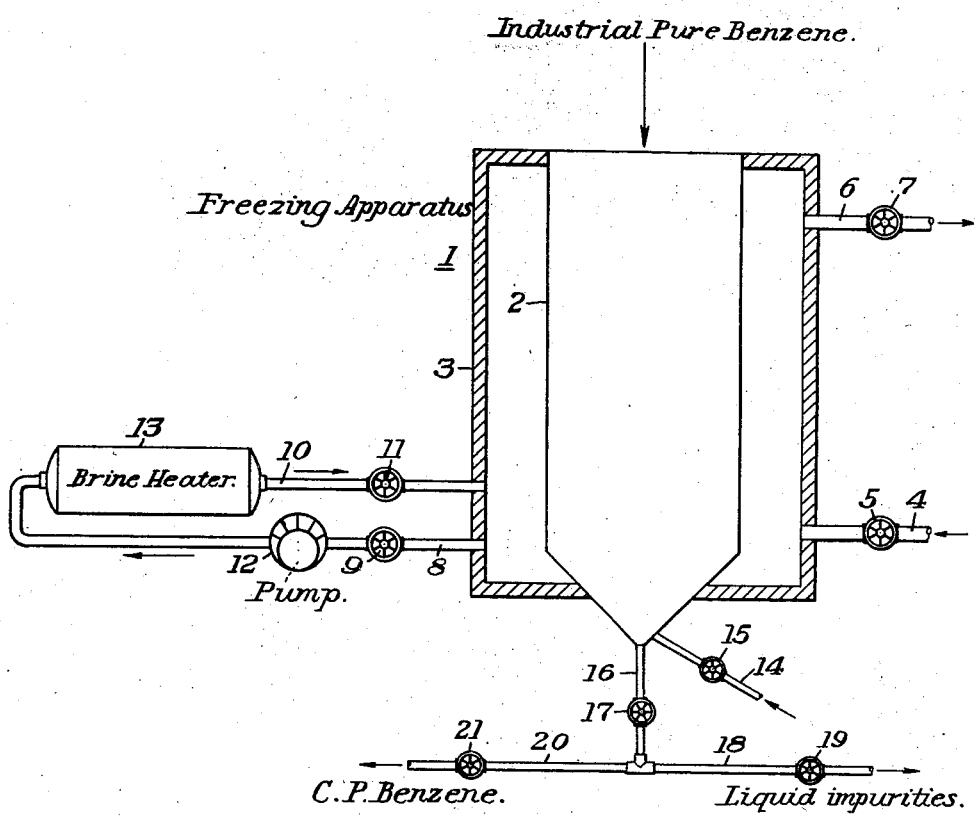

1,991,844

UNITED STATES PATENT OFFICE 1,991,844

PROCESS OF MAKING CHEMICALLY PURE BENZENE

Robert W. Campbell and Fred W. Wagner, Pittsburgh, Pa., assignors to Jones & Laughlin Steel Corporation, Pittsburgh, Pa., a corporation of Pennsylvania Application June 7, 1934, Serial No. 729,438

16 Claims. (Cl. 260—168)

This invention relates to the refining of industrial pure benzene with the removal of impurities which are usually present in ordinary grades of benzene and whose presence seriously affect the efficient production and quality of materials produced by the chlorination or nitration of benzene.

The present application is a continuation-in-part of our copending application Serial No. 676,134, filed June 16, 1933.

By industrial pure benzene we mean that specific distillate produced by the refining of light oil which is a coal-tar distillate. According to present practice, industrial pure benzene is produced by the washing of the crude light oil or one of its fractions with sulphuric acid of 66° Bé. strength (93.19%) or less, in various stages and amounts, drawing off the sludge formed thereby, neutralizing the product, and subjecting the washed and neutralized product to fractional distillation. By industrial pure benzene we mean that fraction which distills, according to the standard distillation test, within a 2.0° C. range and which includes the true boiling point of benzene (80.2° C.).

The benzene produced in this manner contains objectionable impurities such as carbon bisulphide, thiophene and paraffin hydrocarbons. These impurities are identified most readily by their influence on the specific gravity and freezing point as well as the distillation range of the benzene. The thiophene is identified by its reaction with isatin in the presence of sulphuric acid.

Benzene may also be refined by freezing the benzene and separating it from its impurities by pressure and filtration. By this method, the benzene distillate is frozen and large quantities of impurities are entrained in the frozen benzene with the result that a poorer grade of benzene is produced than by fractional distillation. This method of refining has never, heretofore, been commercially employed because the product produced by fractional distillation has been far superior in quality. The separation of benzene from relatively small quantities of impurities such as paraffin hydrocarbons in the boiling range of benzene, carbon bisulphide and thiophene, by the application of freezing or crystallizing the benzene, has heretofore been considered unsatisfactory in the art of refining.

The usual method of producing benzene, known to the trade as "nitration benzene" is to redistill industrial pure benzene and, by careful fractionation, certain receivers of the distillate, which conform with the usual specifications for "nitration benzene" are isolated and combined as a separate product from the main distillate. Nitration benzene is the usual trade name for benzene whose purity is such as to be acceptable to the chemical industry for the production of phenol or nitro-benzene. It is identified by having a freezing point of at least 5.0° C., a distillation range of 1.0° C., a Bromine Index of not over No. 10 and a specific gravity of at least .8820 (15.5° C./15.5° C.). The true freezing point of benzene is usually accepted as 5.5° C. and the specific gravity as .8850 (15.5° C./15.5° C.).

Our process deals with the production of "nitration benzene" from industrial pure benzene, the purity of which is far superior to any material heretofore obtainable. By our process we can produce, in a commercial manner, benzene that has a freezing point of 5.4° C., a specific gravity of .8838 and a Bromine Index of No. 3. The distillation range is approximately 0.5° C. Instead of obtaining a yield of approximately 30%, as is customary in the refractionation of industrial pure benzene, we obtain, by our process, a consistent yield of 80% to 85%.

Our process, which is based upon the principle of fractional crystallization by freezing, embodies new technique in the art of separating benzene from its impurities. As stated previously, it is known that benzene may be, to some limited extent, separated from its homologues, as disclosed by Mansfield in Chemical Society Journal of London (Quarterly Journal) vol. 1, (1849) pp. 256–261, by the application of freezing. It is generally known that, when benzene freezes in the presence of its impurities, relatively large amounts of these impurities, which have a lower freezing point, are entrained in the solid frozen mass. In the case of freezing industrial pure benzene which contains relatively small amounts of impurities but of sufficient quantity as to render it unfit for the production of phenol or nitro-benzene, practically no separation is obtained by the method disclosed by Mansfield or any other freezing method known to the art of benzene refining.

Our process prevents the impurities from being entrained in the frozen mass and, accordingly, the impurities are segregated in liquid form in the center of the frozen mass of benzene and are drawn off in a simple manner. We employ a very carefully controlled rate of freezing while the material being frozen is in constant agitation. By such a procedure, it is believed the benzene molecules are so compressed that it is impossible to entrain any of the impurities and a benzene almost theoretically pure is obtainable by simply drawing off the impurities as a liquid. The frozen benzene is then preferably melted and separated in a liquid form, or it may be removed from the freezing apparatus in solid form.

The accompanying drawing illustrates in a somewhat diagrammatic manner an apparatus suitable for carrying out our process.

Referring more particularly to the accompanying drawing, the industrial pure benzene containing carbon bisulphide, thiophene and paraffin hydrocarbons is charged into a freezing apparatus indicated by the reference numeral 1. The freezing apparatus comprises an inner vertical metal container or can 2 and an outer jacket 3 provided with an inlet pipe 4 and valve 5 and an outlet pipe 6 and valve 7 for the cold brine from the main brine cooling and circulating tank. The outer jacket 3 is also provided with an outlet pipe 8 and cock 9 and an inlet pipe 10 and cock 11 for controlling the circulation of the brine through the pump 12 and the heater 13 in order to warm the brine sufficiently to melt the benzene crystals after the liquid impurities have been withdrawn from the container 2. The container 2 is provided with an air pipe 14 and valve 15 for controlling the air supply used for agitation during the freezing process. The container 2 is also provided with a main drain pipe 16 and valve 17 connected to the pipe 18 controlled by valve 19 for the removal of the liquid impurities, and to the pipe 20 controlled by valve 21 for the removal of the melted benzene crystals.

The following is a specific description of one manner of carrying out our process.

Industrial pure benzene having a boiling range of 2.0° C. (79.5° to 81.5° C.) containing impurities such as carbon bisulphide, thiophene and paraffin hydrocarbons, which may be produced according to present practice by washing the crude light oil or one of its fractions with sulphuric acid of 66° Bé. strength (93.19%) or less, in various stages and amounts, drawing off the sludge formed thereby, neutralizing the product, and subjecting the washed and neutralized product to fractional distillation, is charged into the freezing apparatus indicated by the reference numeral 1. It is preferred, however, where the crude light oil used in making the industrial pure benzene contains substantial amounts of sulphur containing hydrocarbons, for example carbon bisulphide and thiophene, to subject the crude light oil to the acid and distillation treatment described in our above referred to application Ser. No. 676,134. The process described in that application consists briefly in treating the crude light oil with sulphuric acid of 66° Bé. strength or less, drawing off the sludge, neutralizing the product, subjecting the washed and neutralized product to fractional distillation, treating the distillate with sulphuric acid of over 94% up to 100% strength, drawing off the sludge, neutralizing the product, and subjecting the washed and neutralized product to fractional distillation. The industrial pure benzene thus produced and having a boiling range of 2.0° C. (79.5° to 81.5° C.) is then subjected to fractional crystallization.

The industrial pure benzene is charged into a number of containers or cans 2, measuring 10⅞" x 22" x 49", with twenty-eight to thirty-six such containers comprising one compartment, being equally spaced inside of an outer jacket 3 in order to allow the brine to circulate freely around the containers. Each container is charged with 41.5 gallons of industrial pure benzene or 1,162 gallons in a twenty-eight container compartment of 1,494 gallons in a thirty-six container compartment. Usually four such compartments are connected with a brine cooling tank containing a refrigerating coil, by means of the inlet pipes 4 and valves 5 and the outlet pipes 6 and valves 7.

When the containers 2 are charged with industrial pure benzene, the inlet brine valve 5 and the outlet valve 7 are open and brine having a temperature between —4° C. and —15° C. and preferably at an average temperature of —9° C. is in constant circulation around the containers 2. Immediately after charging the benzene, the inlet air valve 15 is opened and the benzene is constantly agitated throughout the freezing cycle with air at approximately 3¼ pounds per square inch pressure.

We prefer to freeze at an average rate not to exceed 5% per hour during the freezing cycle or period. If this rate is materially exceeded, there is danger of entraining too much of the impurities in the frozen benzene. With the apparatus described, the freezing cycle is completed in approximately thirty-nine hours.

When the cycle of freezing is completed, the air valve 15 is closed and the liquid core of impurities is drawn off by gravity from the containers 2 by opening the valves 17 and 19.

After closing the valves 17 and 19, the cold brine around the containers 2 is cut off from the brine cooling tank by closing the valves 5 and 7. The brine cocks 9 and 11 are now opened and the cold brine surrounding the containers 2 is pumped by means of pump 12 through the pipe 8 to a brine heater 13. By means of indirect steam the brine is heated to the proper temperature in the heater 13 and returns to circulate around the containers 2 through the pipe 10. In this manner the benzene crystals are melted by the warm brine circulating around the containers 2. The temperature of the brine is thermostatically controlled not to exceed 27° C. and the melting cycle requires approximately six hours.

When all of the benzene crystals have been melted the pump 12 is shut down and the brine cocks 9 and 11 are closed. The chemically pure benzene is drawn off by gravity from the containers 2 by opening the valves 17 and 21.

The valves 17 and 21 are then closed and the brine circulation to the brine cooling tank is resumed by opening the valves 5 and 7 and the containers 2 are again charged with industrial pure benzene.

We prefer to subject to fractional crystallization industrial pure benzene having a boiling range of 79.5° to 81.5° C. in order to produce our chemically pure benzene having the properties described. We may, however, produce a product which is satisfactory for many purposes by using an industrial pure benzene having a boiling range of 77.5° to 82.5° C. and subjecting it to fractional crystallization as described. The material to be subjected to fractional crystallization should, however, contain at least 90% pure benzene.

Any suitable freezing medium can be employed in freezing the benzene in place of the brine solution.

Instead of using air for agitating the benzene during freezing, any other suitable gas may be employed or we may use mechanical agitation. In the latter case, a stirrer of small diameter should be used so as not to interfere with the freezing of the benzene on the walls of the container 2.

We have described in detail the present preferred manner of practicing our invention and have illustrated diagrammatically an arrangement of apparatus suitable for carrying out our process. It is to be understood, however, that the invention may be otherwise embodied or practiced within the scope of the following claims.

We claim:

1. The process of making chemically pure benzene, which comprises subjecting industrial pure benzene having a boiling range of 77.5° C. to 82.5° C. to fractional crystallization by freezing while agitated to crystallize benzene and remove lower freezing point impurities therefrom.

2. The process of making chemically pure benzene, which comprises subjecting industrial pure benzene having a boiling range of 77.5° C. to 82.5° C. to fractional crystallization by freezing while agitated with air to crystallize benzene and remove lower freezing point impurities therefrom.

3. The process of making chemically pure benzene, which comprises subjecting industrial pure benzene having a boiling range of 79.5° C. to 81.5° C. to fractional crystallization by freezing while agitated to crystallize benzene and remove lower freezing point impurities therefrom.

4. The process of making chemically pure benzene, which comprises subjecting industrial pure benzene having a boiling range of 79.5° C. to 81.5° C. to fractional crystallization by freezing while agitated with air to crystallize benzene and remove lower freezing point impurities therefrom.

5. The process of making chemically pure benzene, which comprises subjecting industrial pure benzene to fractional crystallization by freezing at an average rate not to exceed 5% per hour during the freezing period while agitated to crystallize benzene and remove lower freezing point impurities therefrom.

6. The process of making chemically pure benzene, which comprises subjecting industrial pure benzene to fractional crystallization by freezing at an average rate not to exceed 5% per hour during the freezing period while agitated with air to crystallize benzene and remove lower freezing point impurities therefrom.

7. The process of making chemically pure benzene, which comprises subjecting industrial pure benzene having a boiling range of 79.5° C. to 81.5° C. to fractional crystallization by freezing at an average rate not to exceed 5% per hour during the freezing period while agitated with air to crystallize benzene and remove lower freezing point impurities therefrom.

8. The process of making chemically pure benzene, which comprises subjecting a light oil distillate containing at least 90% pure benzene to fractional crystallization by freezing while agitated to crystallize benzene and remove lower freezing point impurities therefrom.

9. The process of making chemically pure benzene, which comprises subjecting industrial pure benzene to fractional crystallization by freezing while agitated to form a solidified body of chemically pure benzene having a liquid core containing impurities, draining off the liquid, and thereafter removing the benzene.

10. The process of making chemically pure benzene, which comprises subjecting industrial pure benzene to fractional crystallization by freezing while agitated to form a solidified body of chemically pure benzene having a liquid core containing impurities, draining off the liquid, and thereafter melting and drawing off the benzene.

11. The process of making chemically pure benzene, which comprises subjecting industrial pure benzene to fractional crystallization by freezing while agitated with air to form a solidified body of chemically pure benzene having a liquid core containing impurities, draining off the liquid, and thereafter removing the benzene.

12. The process of making chemically pure benzene, which comprises subjecting industrial pure benzene having a boiling range of 77.5° C. to 82.5° C. to fractional crystallization by freezing while agitated with air to form a solidified body of chemically pure benzene having a liquid core containing impurities, draining off the liquid, and thereafter melting and drawing off the benzene.

13. The process of making chemically pure benzene, which comprises subjecting industrial pure benzene to fractional crystallization by freezing at an average rate not to exceed 5% per hour during the freezing period while agitated to form a solidified body of chemically pure benzene having a liquid core containing impurities, draining off the liquid, and thereafter removing the benzene.

14. The process of making chemically pure benzene, which comprises subjecting industrial pure benzene having a boiling range of 77.5° C. to 82.5° C. to fractional crystallization by freezing at an average rate not to exceed 5% per hour during the freezing period and while agitated with air to form a solidified body of chemically pure benzene having a liquid core containing impurities, draining off the liquid, and thereafter melting and drawing off the benzene.

15. The process of making chemically pure benzene, which comprises subjecting industrial pure benzene to fractional crystallization by freezing at a rate not to exceed 5% per hour to form a solidified body of chemically pure benzene having a liquid core containing impurities, draining off the liquid, and thereafter removing the benzene.

16. The process of making chemically pure benzene, which comprises subjecting industrial pure benzene having a boiling range of 79.5° C. to 81.5° C. to fractional crystallization by freezing at a rate not to exceed 5% per hour to form a solidified body of chemically pure benzene having a liquid core containing impurities, draining off the liquid, and thereafter removing the benzene.

ROBERT W. CAMPBELL.
FRED W. WAGNER.